3,558,684
PROCESS FOR THE MANUFACTURE OF ALKENYL ISOCYANATES

Hanswilli von Brachel, Offenbach am Main, and Erwin Herrmann, Frankfurt am Main, Germany, assignors to Cassella Farbwerke Mainkur Aktiengesellschaft, Frankfurt am Main, Germany
No Drawing. Filed Jan. 16, 1968, Ser. No. 698,123
Claims priority, application Germany, Jan. 18, 1967, C 41,254
Int. Cl. C07c *119/04*
U.S. Cl. 260—453    8 Claims

ABSTRACT OF THE DISCLOSURE

Preparation of alpha-beta alkenyl isocyanate by reacting corresponding alkenyl halide with cyanate of alkali metal or alkaline earth metal in aprotic polar solvent, is sharply improved by adding to the reaction mixture a catalytic quantity of metallic copper or of acceptable cuprous compound such as the halides, along with a substantially non-polar inert solvent.

---

The present invention is an improvement over the method of preparing alkenyl isocyanates as described in U.S. Pat. 2,866,801 granted Dec. 30, 1958.

According to the above patent organic isocyanates including alpha-beta alkenyl isocyanates are readily prepared by reacting in dialkylamides of lower carboxylic acids, the cyanate of an alkali metal or of an alkaline earth metal with an organic halide corresponding to the desired isocyanate. The yields of alkenyl isocyanate so obtained are relatively small, and are not materially changed when the dialkylamides are replaced by other aprotic strongly polar solvents such as N-methyl pyrrolidone-2, dimethyl sulfoxide, sulfolane (tetrahydrothiophene dioxide-1,1), benzonitrile, acetonitrile, nitromethane, dimethyl sulfone and diphenyl sulfone. Mixing these solvents in various proportions with non-polar or weakly polar solvents (these are solvents having the dielectric constant $\epsilon$ of below 20) such as benzene, toluene, xylene, mesitylene, chlorobenzene, dichlorobenzenes, cyclohexane, ethyl butyrate and other esters, methyl isobutyl ketone and other ketones, and dibutyl ether as well as other ethers, does not improve the process of that patent.

It has now been discovered that the foregoing reaction with alpha-beta alkenyl halides takes place with much higher yields when such a mixture of solvents is present in the reaction mixture along with catalytic amounts of metallic copper or of an acceptable cuprous compound such as the halides and similar cuprous salts as well as cuprous oxide. Mixtures of these catalytic materials can also be used and mixtures of copper powder and a cuprous salt are preferred.

The following examples illustrate the present invention, parts being by weight and temperatures in degrees centigrade.

EXAMPLE 1

76.5 parts allyl chloride,
100 parts sodium cyanate and
8 parts copper (I) chloride are introduced into a solvent mixture composed of
180 parts anhydrous xylene and
20 parts N-methyl pyrrolidone-2.

After five hours heating at 130° in an enameled autoclave, the inorganic salts are filtered off and the filtrate is separated by fractional distillation, whereby 62.5 parts allyl isocyanate (75% of theoretical based on the original quantity of allyl chloride) having a boiling point of 82–85°/760 mm. Hg are obtained.

EXAMPLE 2

121 parts allyl bromide,
140 parts potassium cyanate and
13 parts copper (I) bromide are introduced into a solvent mixture composed of
220 parts mesitylene and
20 parts dimethyl formamide.

After five hours heating at 110° in an enameled autoclave and working up according to Example 1, 60 parts allyl isocyanate (72% of the theoretical based on the original quantity of allyl bromide) are obtained.

EXAMPLE 3

76.5 parts allyl chloride,
65 parts sodium cyanate,
4 parts copper (I) chloride and
1 part copper powder are introduced into a solvent mixture made from
180 parts anhydrous xylene and
20 parts N-methyl pyrrolidone-2.

After five hours heating at 130° in an enameled autoclave and working up according to Example 1, 66 parts allyl isocyanate (80% of the theoretical) are obtained.

If the reaction is run according to Example 3 but without the copper (I) chloride and copper powder, allyl isocyanate is obtained with a yield amounting to only 2% of the theoretical.

EXAMPLE 4

76.5 parts allyl chloride,
100 parts sodium cyanate and
4 parts copper powder are introduced into a solvent mixture composed of
180 parts anhydrous xylene and
20 parts N-methyl pyrrolidone-2.

After half an hour heating at 130° in an enameled autoclave, the volatile components having a boiling point of below 135° are distilled off from the reaction mixture. The distillate is subjected to a fractional distillation, whereby 55 parts allyl isocyanate (66% of the theoretical) are obtained.

EXAMPLE 5

90.5 parts methallyl chloride,
140 parts potassium cyanate and
7 parts copper (I) bromide are introduced into a solvent mixture consisting of
200 parts o-dichloro benzene and
30 parts dimethyl sulfoxide.

After five hours heating at 150° in an enameled autoclave and after working up according to Example 1, 58 parts methallyl isocyanate (60% of the theoretical referred to methallyl chloride) having a boiling point of 105–110°/760 mm. Hg. are obtained.

EXAMPLE 6

135 parts crotyl bromide,
140 parts potassium cyanate and
10 parts copper (I) bromide are introduced into a solvent mixture made from
190 parts n-octane and
50 parts benzyl cyanide.

After five hours heating at 140° in an enameled autoclave and after working up according to Example 1, 63 parts crotyl isocyanate (65% of the theoretical referred to crotyl bromide) having a boiling point of 95–100°/760 mm. Hg are obtained.

EXAMPLE 7

470 parts allyl bromide,
308 parts potassium cyanate,
16 parts copper (I) bromide and
7 parts copper powder are introduced into a solvent mixture consisting of
640 parts 1,2,4-trichloro benzene and
160 parts N-methyl-pyrrolidone-2.

After three hours heating at 100° under reflux at atmospheric pressure, 193 parts allyl isocyanate (61% of theoretical) are fractionally distilled from the reaction mixture.

Similar results are obtained when calcium cyanate, lithium cyanate and other alkaline earth cyanates are used in place of the sodium or potassium cyanates.

To obtain these good results the reaction solvents should be mixtures of 1 to 80%, preferably 5 to 40%, by weight aprotic polar solvent, and 99 to 20%, preferably 95 to 60%, nonpolar or slightly polar solvent. Also reaction temperatures between 80 and 160° C., especially between 100 and 140° C., are most effective, with reaction times of 10 minutes to 10 hours, as are catalyst concentrations of about 1–5 grams copper content per mol of alkenyl halide. Where the catalyst is not in finely divided condition—that is, is larger than about 20 mesh in particle size—larger proportions of them are desirable. A copper-lined reactor for instance will have very little catalytic effect.

Copper compounds that contain components interfering with the reaction, such as hydroxyl, sulfonic acid or carboxyl groups, or bound water or ammonia, are not acceptable for the purposes of the present invention.

The alpha-beta alkenyl halides of the present invention have at least three carbons in a chain, with a double bond between a carbon (alpha carbon) adjacent the one carrying the halogen, and the carbon (the beta carbon) that follows that adjacent carbon. The carbon carrying the halogen can be at an end of a carbon chain or in an intermediate position in such a chain and such intermediate carbon can be a secondary or tertiary carbon. The chain can have a length or as many as 20 carbons or even more, and can be open or cyclized in a non-aromatic ring. Suitable rings are cyclohexenyl or cycloheptenyl or dihydronaphthyl or the like. Two or more halogens can also be on one alkenyl group, and all such halogens will be replaced by isocyanate groups by the process of the present invention. Thus the process of this invention operates with the following halides in addition to those of the examples: allyl iodide, methallyl bromide, crotyl chloride (2-butenyl chloride), 3-chlorocyclohexene-1, 3-bromocyclohexene-1, 3-bromooctene-1, 3-chloropentene-1, 3-bromopentene-1, 3-bromodecene-1, 1-bromodecane-2, 1-chloro-2-methyl-butene-2, cinnamyl bromide, 1,4-dichloro-butene-2, 3,4-dichloro-butene-1, 1,4-dibromo-butene-2, 3-chloro-pentadiene-1,4 and 1,4-dichloro-2-methyl-butene-2. The fluorine of alkenyl fluorides is not sufficiently active for reaction with the inorganic isocyanates with or without the solvent and catalyst combinations of the present invention.

The alkenyl isocyanates prepared according to the present invention are generally old compounds. They are all useful for copolymerization with vinyl acetate or ethyl acrylate or acrylamide to make textile finishing agents as described in U.S. Pat. 2,606,892. They can also be all converted to urethanes with phenols as described in French Pat. 1,439,118 yielding insecticidal products effective against insects like calandra granaria. The diisocyanates produced in accordance with the present invention are also suitable for making polyurethane resins that are cross-linked through the urethane groups formed from the isocyanate groups after their reaction with cross-linking agents such as high-molecular polyesters and polyethers of the alkyd resin type with functional hydroxy groups, for example the reaction product made from 3 moles adipic acid, 3 moles butylene glycol and 1 mol of a triol, such as glycerin or hexanetriol, to make particularly hard products suitable for coating floors and the like.

What is claimed:

1. In the process of preparing alpha-beta alkenyl isocyanate having a carbon chain length of from 3 to 20 carbon atoms and being open chained or cyclized in a non-aromatic ring by the steps of heating the corresponding alkenyl chloride or alkenyl bromide or alkenyl iodide with the cyanate of an alkali-metal or of an alkaline earth metal in an aprotic polar solvent at a temperature between 80 and 160° C. and separating resulting alpha-beta alkenyl isocyanate by distillation, the improvement comprising including in the reaction mixture 99 to 20 weight percent, based on total solvent, of an inert solvent having a dielectric constant of below 20 as well as a catalytic amount of copper, cuprous chloride, cuprous bromide, cuprous oxide or a mixture thereof.

2. The process of claim 1 wherein the reaction temperature is between 100 and 140° C.

3. The process of claim 1 wherein the reaction mixture contains, based on total solvent, 95 to 60 weight percent of the inert solvent having a dielectric constant of below 20.

4. The process of claim 1 wherein the inert solvent having a dielectric constant of below 20 is selected from the group consisting of benzene, toluene, xylene, mesitylene, chlorobenzene, dichlorobenzene, 1,2,4-trichlorobenzene, cyclohexane, ethyl butyrate, methyl isobutyl ketone, dibutyl ether and n-octane.

5. The process of claim 1 wherein powdered copper is used.

6. The process of claim 1 wherein finely divided copper having particles not larger than 20 mesh is used.

7. The process of claim 1 wherein a mixture of copper powder and cuprous chloride or bromide is used.

8. The process of claim 1 wherein the alkenyl chloride or bromide or iodide is selected from the group consisting of allyl chloride, allyl bromide, allyl iodide, methallyl chloride, methallyl bromide, crotyl bromide, crotyl chloride, 3-chlorocyclohexene-1,3-bromocyclohexene-1, 3-bromo-octene-1, 3-chloropentene-1, 3-bromopentene-1, 3-bromodecene-1, 1-bromodecene-2, 1-chloro-2-methyl-butene-2, cinnamyl bromide, 1,4-dichlorobutene-2, 3,4-dichlorobutene-1, 1,4-dibromobutene-2, 3-chloropentadiene-1,4, 1,4-dichloro-2-methyl-butene-2.

References Cited

UNITED STATES PATENTS

| | | | |
|---|---|---|---|
| 2,866,801 | 12/1958 | Himel et al. | 260—453 |
| 3,201,433 | 8/1965 | Manes et al. | 260—453 |
| 3,242,140 | 3/1966 | Hoover | 260—453X |
| 3,440,269 | 4/1969 | McMaster | 260—453 |
| 3,453,310 | 7/1969 | Zenner et al. | 260—453 |

JOSEPH P. BRUST, Primary Examiner

D. H. TORRENCE, Assistant Examiner